(12) United States Patent
Bansal

(10) Patent No.: US 7,310,590 B1
(45) Date of Patent: Dec. 18, 2007

(54) TIME SERIES ANOMALY DETECTION USING MULTIPLE STATISTICAL MODELS

(75) Inventor: Jyoti Bansal, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 11/560,312

(22) Filed: Nov. 15, 2006

(51) Int. Cl.
*G06F 19/00* (2006.01)

(52) U.S. Cl. .......................................... 702/181; 703/22

(58) Field of Classification Search ................. 702/181, 702/182–185, 188; 714/25, 47; 703/1, 22
See application file for complete search history.

(56) References Cited

U.S. PATENT DOCUMENTS

2007/0088534 A1* 4/2007 MacArthur et al. ........... 703/17

* cited by examiner

*Primary Examiner*—Edward Raymond
(74) *Attorney, Agent, or Firm*—Vierra Magen Marcus & DeNiro LLP

(57) ABSTRACT

A time series is analyzed by multiple functions simultaneously to identify an anomaly for a data point in the series. Data point values are predicted by the multiple functions. An anomaly occurs when an actual data point in the series differs significantly from the data point's predicted value as generated by the functions. If enough statistical models detect an anomaly has occurred for a data point, an anomaly event is generated. The set of functions can include different types of functions, the same function type configured with different constants, or a combination of these.

31 Claims, 9 Drawing Sheets

TIME SERIES ANOMALY DETECTION USING MULTIPLE STATISTICAL MODELS

BACKGROUND

Software applications are monitored to determine their health and efficiency. During monitoring of complex software applications, a time series can be generated for monitored variables. The time series is a set of data for a given variable at different points in time. For example, a time series for temperature may include values of temperatures recorded every hour over a twenty-four hour period (65, 68, 70, 71, 72, 68, and so on). With respect to application monitoring, a time series may be analyzed to determine the health of the application being monitored.

A time series for an application may indicate that the application is not healthy if an anomaly occurs in the time series. An anomaly occurs if an actual value is different from an expected or predicted value. Thus, if a value of a data point in a temperature time series is expected to be eighty-five degrees, and the actual data point value is one hundred fifteen degrees, an anomaly has occurred with respect to the data point.

One challenge of analyzing a time series is to identify the difference between a false positive (a false identification of an anomaly) and an actual anomaly while still identifying all events of interest. Most systems for detecting an anomaly in a time series rely on simple rules and thresholds (for example, a single number or a percentage). These static rules and thresholds are sufficient for some applications, but can't detect some subtle changes in behavior. Further, applying static criteria is troublesome when identifying and specifying suitable thresholds for thousands of time series, such as in the case of application management.

Some monitoring systems use a statistical model to predict time series data points and identify anomalies. The success of statistical models is often erratic. Usually, these systems employ a balance between selectivity (avoiding false positives) and sensitivity (ability to detect true positives). It is difficult to analyze a time series to accurately detect an anomaly.

SUMMARY

An anomaly detection system analyzes an application data time series to identify anomalies. Data points are predicted using multiple statistical model functions. The set of functions for predicting values can include different types of functions, the same function type configured with different constants, or a combination of these. An anomaly occurs when an actual data point in the series differs significantly from the data point's expected value as generated by the functions. If enough functions detect an anomaly has occurred for a data point, an anomaly event is generated. In some embodiments, if an actual data point value is not within a threshold of the predicted data point value, a vote is cast towards an anomaly on behalf of the function. If enough votes are cast for a data point, the data point is identified as an anomaly.

In one embodiment, an anomaly may be detected by receiving a first set of data of a time series, accessing two or more functions fitted to the time series, determining whether the first set of data differs from a predicted value for each function by more than a threshold for each function, and calculating a first count as the number of the two or more functions for which the first set of data differs by more than the threshold from the predicted value for the function. A determination is then made as to whether to generate an anomaly event based on the value of the first count.

In one embodiment, an anomaly detection system may receive a series of data points, predict an expected data point for each of two or more functions, and compare a data point of the data series to the two or more expected data points. The system may then determine whether to generate an event based on the two or more comparisons.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

An anomaly detection system analyzes a time series to identify anomalies. The time series is analyzed by multiple statistical models simultaneously. An anomaly is when an actual data point in the series differs significantly from the data point's expected value as generated by a statistical model. Anomaly detection is important in application monitoring because the actual value may differ from an expected value due to degraded health and/or performance of the application. If enough statistical models detect an anomaly has occurred for a data point, an anomaly event is generated. After analyzing a data point, the statistical model is updated to reflect the entire set of data in the time series and the next data point is analyzed.

In one embodiment, the time series is a set of application performance data, such as response time or other data. The time series may be received continuously, periodically in a group, or in some other manner. Data points are predicted using statistical models (or "functions"). A set of two or more functions may be used to analyze each data point in the time series. The set of functions can include different types of functions, the same function type tuned with different constants, or a combination of these. If an actual data point value is not within a threshold of the predicted data point value, a "vote" is cast towards an anomaly on behalf of the function. If enough votes are cast for a data point, the data point is identified as an anomaly. The number of votes required may be more than one, half, a majority, or some other number.

In some embodiments, different functions can be used to analyze a time series for different periods of time. For example, an application which generates a time series may experience more activity (for example, receive more traffic) during business hours, or more activity on weekdays then weekends. The change from a recognized busy period to a less busy period (e.g, Friday to Saturday, or 5 p.m. to 6 p.m.) may cause a change in the time series data which could be mistaken as an anomaly. In this case, the change would be due to a change in application activity level, not due to an anomaly caused by degraded application health or performance. Thus, the anomaly detection system may be configured to utilize different functions at activity transition periods or to adjust the functions to better approximate the changed time series as the application activity changes.

Figure 1A:
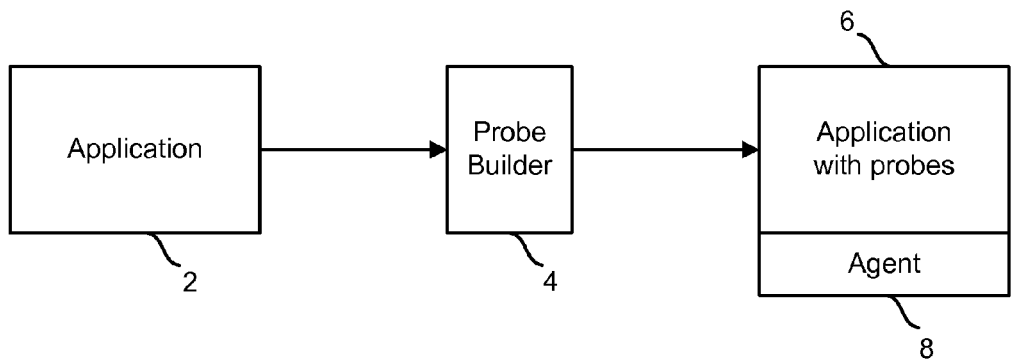
FIG. 1A is a block diagram describing how bytecode for an application is instrumented.

In one embodiment, the technology herein can be used to generate a time series of application performance data points an application on an application server using bytecode instrumentation. The technology herein may also be used to access information from the particular application. To generate the time series, an application management tool may instrument the application's object code (also called bytecode). FIG. 1A depicts an exemplar process for modifying an application's bytecode. FIG. 1A shows Application 2, Probe Builder 4, Application 6 and Agent 8. Application 6 includes probes used to access information from the application, and application 2 is the application before the probes are added. Application 2 can be a Java application or a different type of application.

Probe Builder 4 instruments (e.g. modifies) the bytecode for Application 2 to add probes and additional code to Application 2 in order to create Application 6. The probes may measure specific pieces of information about the application without changing the application's business logic. Probe Builder 4 also generates Agent 8. Agent 8 may be installed on the same machine as Application 6 or a separate machine. Once the probes have been installed in the application bytecode, the application is referred to as a managed application. More information about instrumenting byte code can be found in U.S. Pat. No. 6,260,187 "System For Modifying Object Oriented Code" by Lewis K. Cirne, incorporated herein by reference in its entirety.

In one embodiment, the technology described herein doesn't actually modify source code. Rather, the present invention modifies object code. The object code is modified conceptually in the same manner that source code modifications are made. More information about such object code modification can be found in U.S. patent application Ser. No. 09/795,901, "Adding Functionality To Existing Code At Exits," filed on Feb. 28, 2001, incorporated herein by reference in its entirety.

Figure 1B:
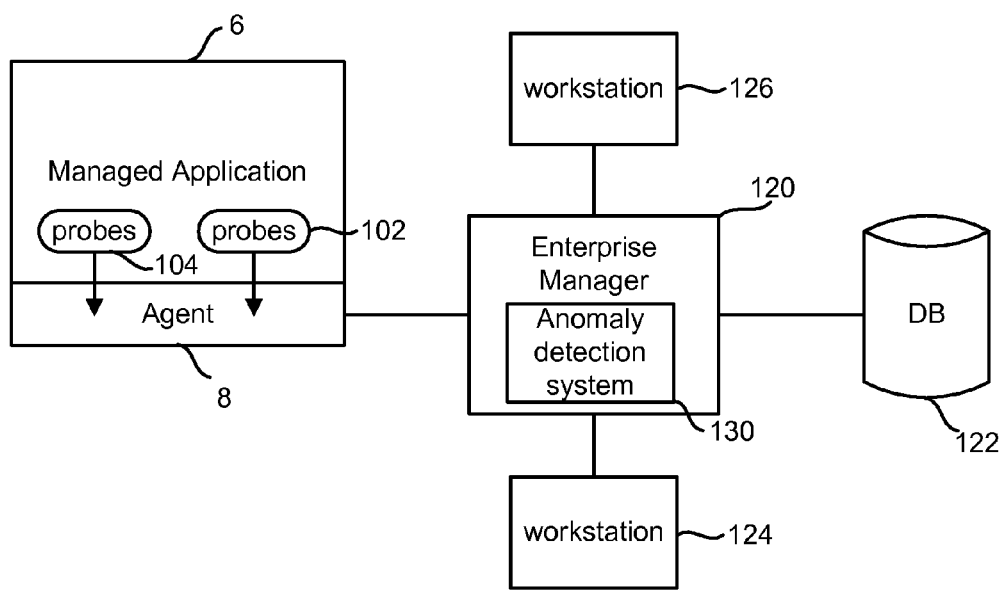
FIG. 1B is a block diagram of a system for monitoring an application.

FIG. 1B is a conceptual view of the components of the anomaly detection system. In addition to managed Application 6 with probes 102 and 104, FIG. 1B also depicts Enterprise Manager 120, database 122, workstation 124 and workstation 126. As a managed application runs, probes (e.g. 102 and/or 104) relay data to Agent 8. In one embodiment, probes 102 and 104 may be implemented at least in part by one or more filters, such as a servlet filter. Servlet filters are discussed in more detail below. Agent 8 then collects and summarizes the data, and sends it to Enterprise Manager 120.

Enterprise Manager 120 includes anomaly detection application 130 and receives application performance data from managed applications via Agent 8, runs requested calculations, makes application performance data available to workstations (e.g. 124 and 126) and optionally sends application performance data to database 122 for later analysis. Anomaly detection application 130 implements the anomaly detection functions discussed herein and is discussed in more detail with respect to FIG. 1C. The workstations (e.g. 124 and 126) are the graphical user interface for viewing application performance data. The workstations are used to create custom views of application performance data which can be monitored by a human operator. In one embodiment, the workstations consist of two main windows: a console and an explorer. The console displays application performance data in a set of customizable views. The explorer depicts alerts and calculators that filter application performance data so that the data can be viewed in a meaningful way. The elements of the workstation that organize, manipulate, filter and display application performance data include actions, alerts, calculators, dashboards, persistent collections, metric groupings, comparisons, smart triggers and SNMP collections.

In one embodiment of the system of FIG. 1B, each of the components are running on different machines. That is, workstation 126 is on a first computing device, workstation 124 is on a second computing device, Enterprise Manager 120 is on a third computing device, and managed Application 6 is running on a fourth computing device. In another embodiment, two or more (or all) of the components are operating on the same computing device. For example, managed application 6 and Agent 8 may be on a first computing device, Enterprise Manager 120 on a second computing device and a workstation on a third computing device. Alternatively, all of the components of Figure two can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

Figure 1C:
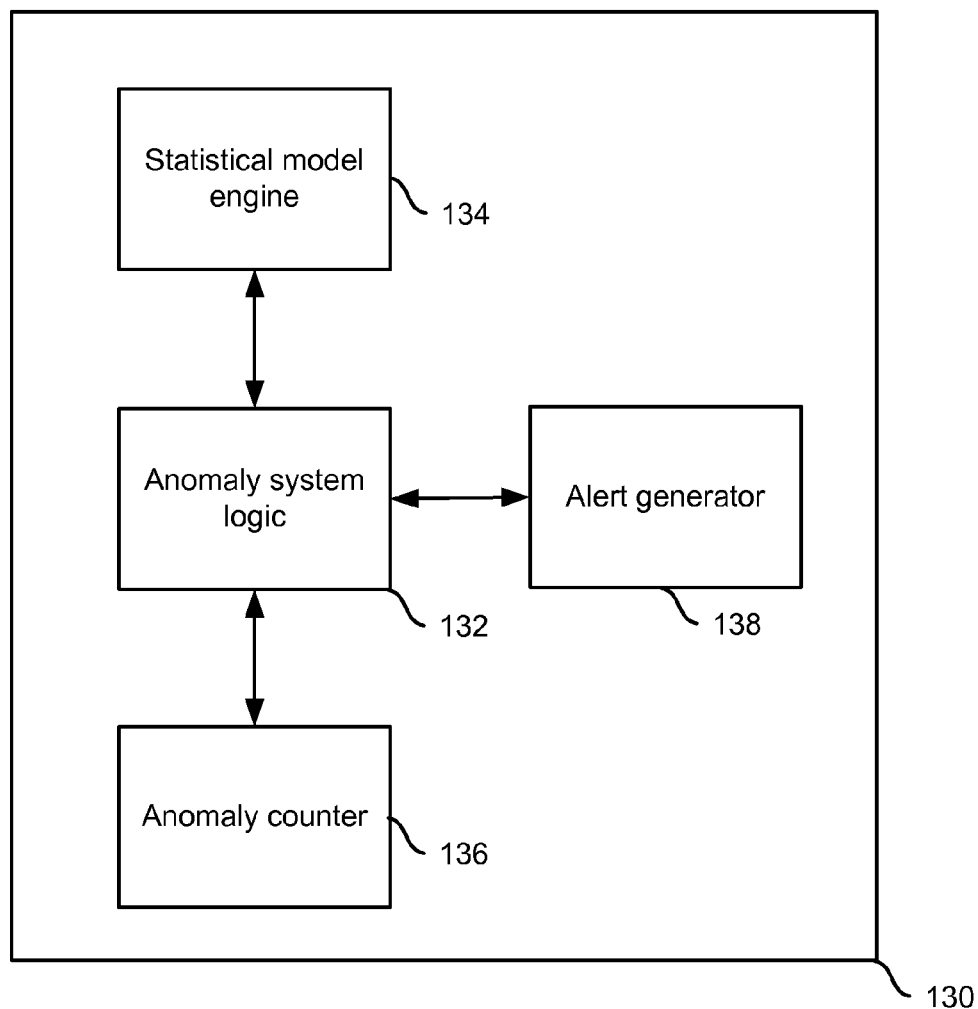
FIG. 1C is a block diagram of a logical representation of an anomaly detection application.

FIG. 1C is a block diagram of a logical representation of an anomaly detection application. Anomaly detection application 130 includes anomaly detection logic 132, statistical model engine 134, anomaly counter 136 and alert generator 138. Anomaly detection logic 132 includes logic that performs processing on the performance data which comprises the time series. In particular, anomaly detection logic 132 includes logic that carries out the process of FIGS. 3-7 discussed below. Statistical model engine 134 runs statistical models to process the time series of application performance data. For example, to generate a predicated data point, anomaly detection logic 132 will provide statistical model engine 134 instructions with the desired data point information (for example, instructions to generate data point N+1). Statistical model engine 134 will then generate the predicted data point and provide the point to Anomaly detection logic 132. Statistical model engine 134 may also process instructions to fit a time series to a function, update a function based on most recent data points, and other functions. Anomaly counter 136 is used to track the number of functions for which a predicted data point and actual data point are not within a threshold of each other. Alert generator 138 may send an alert to an administrator upon receiving an anomaly event from anomaly system logic 132.

Figure 2:
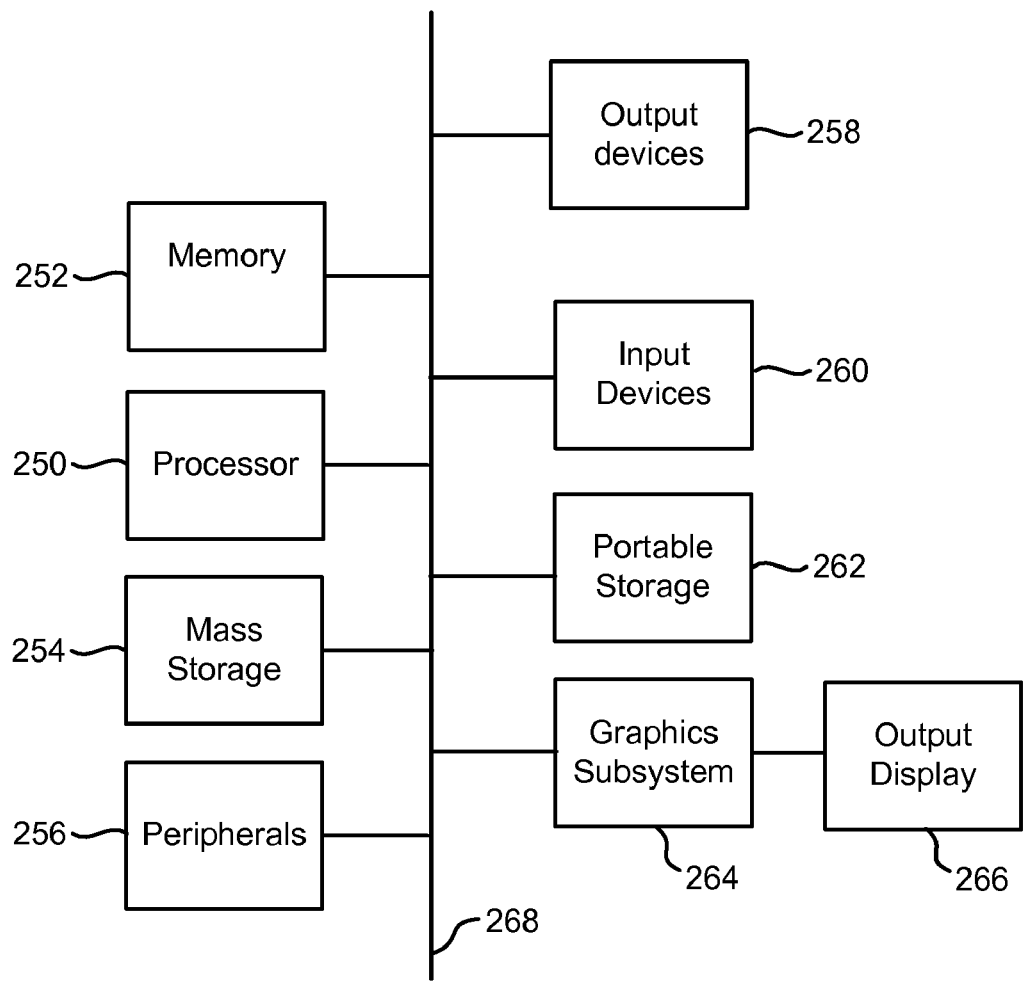
FIG. 2 illustrates an embodiment of a system for implementing the present technology.

FIG. 2 illustrates an embodiment of a computing system 200 for implementing the present technology. In one embodiment, the system of FIG. 2 may implement Enterprise manager 120, database 122, and workstations 124-126.

The computer system of FIG. 2 includes one or more processors 250 and main memory 252. Main memory 252 stores, in part, instructions and data for execution by processor unit 250. If the system of the present invention is wholly or partially implemented in software, main memory 252 can store the executable code when in operation. The system of FIG. 2 further includes a mass storage device 254, peripheral device(s) 256, user input device(s) 260, output devices 258, portable storage medium drive(s) 262, a graphics subsystem 264 and an output display 266. For purposes of simplicity, the components shown in FIG. 2 are depicted as being connected via a single bus 268. However, the components may be connected through one or more data transport means. For example, processor unit 250 and main memory 252 may be connected via a local microprocessor bus, and the mass storage device 254, peripheral device(s) 256, portable storage medium drive(s) 262, and graphics subsystem 64 may be connected via one or more input/output (I/O) buses. Mass storage device 254, which may be implemented with a magnetic disk drive or an optical disk drive, is a non-volatile storage device for storing data and instructions for use by processor unit 250. In one embodiment, mass storage device 254 stores the system software for implementing the present invention for purposes of loading to main memory 252.

Portable storage medium drive 262 operates in conjunction with a portable non-volatile storage medium, such as a floppy disk, to input and output data and code to and from the computer system of FIG. 2. In one embodiment, the system software for implementing the present invention is stored on such a portable medium, and is input to the computer system via the portable storage medium drive 262. Peripheral device(s) 256 may include any type of computer support device, such as an input/output (I/O) interface, to add additional functionality to the computer system. For example, peripheral device(s) 256 may include a network interface for connecting the computer system to a network, a modem, a router, etc.

User input device(s) 260 provides a portion of a user interface. User input device(s) 260 may include an alphanumeric keypad for inputting alpha-numeric and other information, or a pointing device, such as a mouse, a trackball, stylus, or cursor direction keys. In order to display textual and graphical information, the computer system of FIG. 2 includes graphics subsystem 264 and output display 266. Output display 266 may include a cathode ray tube (CRT) display, liquid crystal display (LCD) or other suitable display device. Graphics subsystem 264 receives textual and graphical information, and processes the information for output to display 266. Additionally, the system of FIG. 2 includes output devices 258. Examples of suitable output devices include speakers, printers, network interfaces, monitors, etc.

The components contained in the computer system of FIG. 2 are those typically found in computer systems suitable for use with the present invention, and are intended to represent a broad category of such computer components that are well known in the art. Thus, the computer system of FIG. 2 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 3:
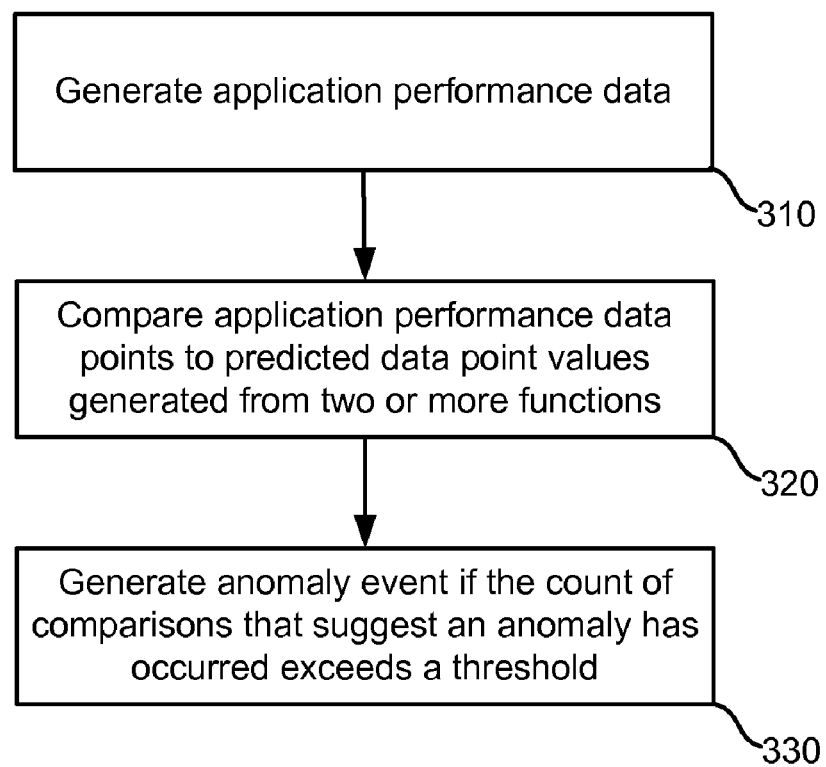
FIG. 3 illustrates a flowchart of an embodiment of a process for processing generated application performance data to identify an anomaly.

FIG. 3 illustrates a flowchart of an embodiment of a process for processing generated application performance data to identify an anomaly. The process of FIG. 3 illustrates a high level process of one embodiment of the present technology. First, application performance data is generated at step 310. The application performance data is generated by Agent 8 while monitoring an application during runtime. The generated application performance data is sent to enterprise manager 120 by agent 8 as discussed above.

The application performance data is compared to predicted values of the data generated from two or more functions at step 320. As discussed above, two or more functions may be used to identify an anomaly by predicting the value of a data point in the application performance data time series. The predicted value generated by each function for the data point is compared to the actual value of the time series data point.

An anomaly event may be generated if the count of comparisons that suggest an anomaly has occurred exceeds a threshold at step 330. Thus, each predicted data points may be associated with a threshold. The threshold may be a number, a range, a percentage, or some other value(s). For each comparison, a determination is made as to whether the difference between actual data point value and the predicted value exceeds a threshold. If the difference exceeds the threshold, a "vote" is cast to generate an anomaly event. After the predicted values for each function have been compared to the actual value of the data point, the number of votes of vote "count" is determined. If the count is greater than a threshold count, then an anomaly event is identified. This is discussed in more detail below with respect to the process of FIGS. 4A-4B

Figure 4A:
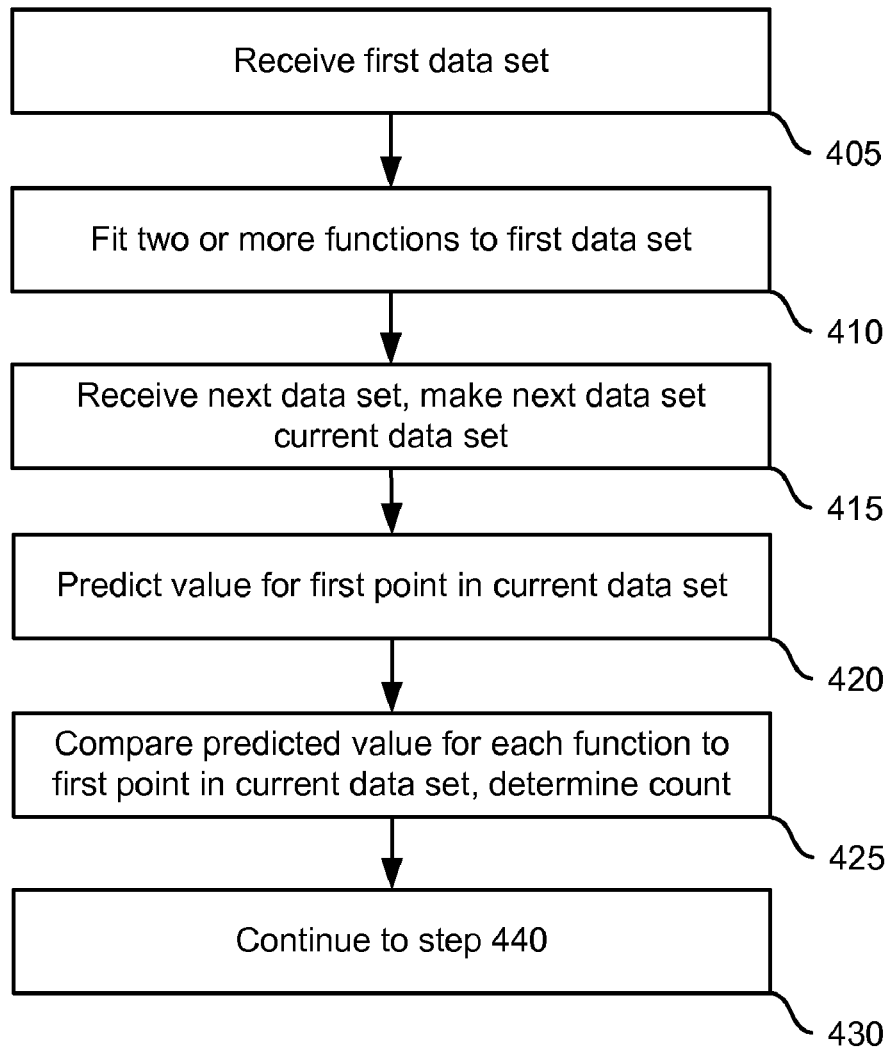
FIGS. 4A and 4B illustrate flowcharts of an embodiment of a process for generating an anomaly event.
Figure 4B:
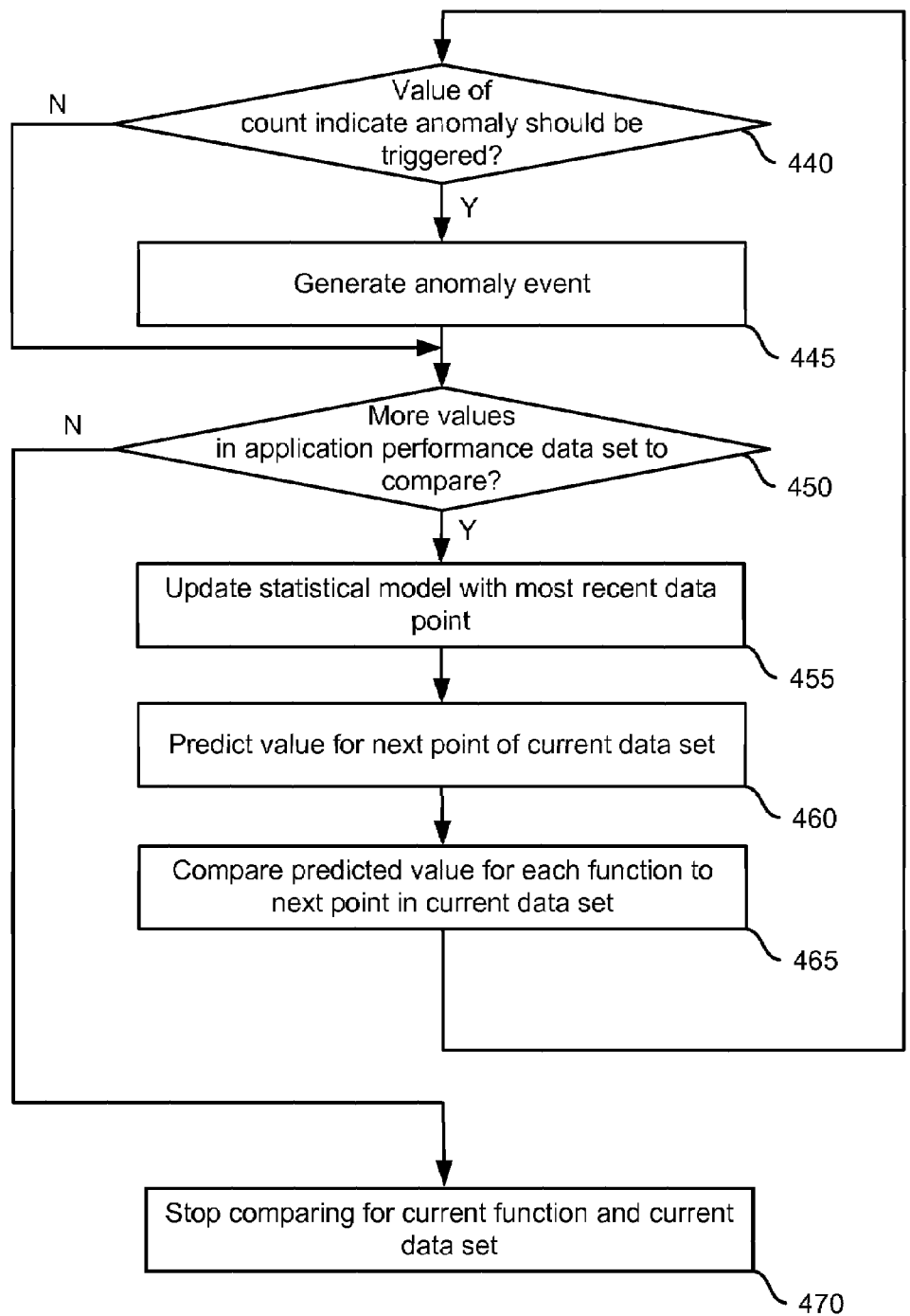

FIGS. 4A and 4B illustrate a flowchart of an embodiment of a process for generating an anomaly event. The process of FIGS. 4A-4B provide more detail for the process of FIG. 3. A first data set is received at step 405. The first data set may be received as a first group of data in a set of groups received periodically. For example, sets of data may be received and processed by enterprise manager 120 from agent 8 every fifteen seconds. In some embodiments, the first set of data may be a selected portion of a continuous data stream. For example, the first data set may be identified as the first fifty data points in a data stream.

Two or more functions may be fit to the first data set at step 410. Fitting data functions to a dataset may include determining function constants. The constants may be determined from the first data set and enable each function to be fit to the first data set. In some embodiment, fitting two or more functions may include selecting the functions from a group of functions. For example, the five best fitting functions which best fit the first data set may be selected from a group of ten functions.

Several types of functions providing statistical models of an application performance data time series may be used with the present technology. Examples of statistical models suitable for use may include simple moving average, weighted moving average, single exponential smoothing, double exponential smoothing, triple double exponential smoothing, exponentially weighted moving average, Holt's linear exponential smoothing, Holt-Winters forecasting technique, and others.

For example, a moving averages statistical model takes a number of past periods, adds them together, and divides by the total number of periods. Simple moving averages statistical models are effective for a time series that is stationary in both mean and variance. A formula used in finding the moving average of order n, MA(n) for a period t+1, is $MA_{t+1} = [D_t + D_{t-1} + \ldots + D_{t-n+1}]/n$, where n is the number of observations used in the calculation. The forecast for time period t+1 is the forecast for all future time periods.

A weighted moving averages statistical function is given as weighted $MA(3) = w_1 \cdot D_t + w_2 \cdot D_{t-1} + w_3 \cdot D_{t-2}$, where the weights are any positive numbers such that w1+w2+w3=1.

A single exponential smoothing statistical model may be calculated as $F_{t+1} = \alpha D_t + (1-\alpha) F_t$, where $D_t$ is the actual value, $F_t$ is the forecasted value, $\alpha$ is the weighting factor, which ranges from 0 to 1, and t is the current time period. A single exponential smoothing statistical model calculates the smoothed series as a damping coefficient times the actual series, plus one minus the damping coefficient times the lagged value of the smoothed series. A small a provides a detectable and visible smoothing, while a large α provides a fast response to the recent changes in the time series but provides a smaller amount of smoothing.

An exponential smoothing over an already smoothed time series is called double-exponential smoothing. A double exponential smoothing applies the process described above to account for linear trend. The extrapolated series has a constant growth rate, equal to the growth of the smoothed series at the end of the data period. In some cases, it might be necessary to extend the series to a triple-exponential smoothing. While simple exponential smoothing requires stationary condition, the double-exponential smoothing can capture linear trends, and triple-exponential smoothing can handle almost all other time series.

An exponentially weighted moving average provides for the weight of each observed data point to drop exponentially the further back (k) in time it is. The weight of any individual is $\alpha(1-\alpha)^k$, where a is the smoothing constant. An exponentially weighted moving average with a smoothing constant α corresponds roughly to a simple moving average of length n, where a and n are related by $\alpha = 2/(n+1)$ or $n = (2-\alpha)/\alpha$. Thus, an exponentially weighted moving average with a smoothing constant equal to 0.1 would correspond roughly to a 19 data point moving average. Similarly, a 40-data point simple moving average would correspond roughly to an exponentially weighted moving average with a smoothing constant equal to 0.04878.

Holt's linear exponential smoothing technique estimates a trend and current level in a time series. The trend $T_t$ at time t is the difference between the current and previous level. The updating equations express ideas similar to those for exponential smoothing. The level may expressed as $L_t = \alpha y_t + (1-\alpha) F_t$, and the trend may be expressed as $T_t = \beta(L_t - L_{t-1}) + (1-\beta) T_{t-1}$. Smoothing parameters α and β must be positive and less than one. The forecasting for k periods into the future is $F_{n+k} = L_n + k \cdot T_n$. Given that the level and trend remain unchanged, the initial (starting) values are $T_2 = y_2 - y_1$, $L_2 = y_2$, and $F_3 = L_2 + T_2$.

After fitting the functions to the first data set, the next data set is received at step 415. This data set is now considered the current data set. The next data set may be a second set of data received periodically, a group of data collected from a continuous data stream, or a set of time series data points received in some other manner. The set of data received at step 415 is part of the same time series data received at step 405.

Values are predicted for the first point in a current data set at step 420. For a current value of N, a next value N+1 is predicted for each function using statistical model formulas such as those described above. Thus, for two or more functions, a predicted data point is generated for each function, resulting in two or more predicted data points. Predicting data points at step 420 is discussed in more detail below with respect to the process of FIG. 5.

Predicted values for each function are compared to the first point in the current data set, resulting in a count, at step 425. For each comparison, a determination is made as to whether the difference between the first data point and the predicted data is greater than a threshold. If so, a count is incremented. Step 425 is discussed in more detail below with respect to the process of FIG. 6.

Next, a determination is made as to whether the value of the count indicates that an anomaly has occurred at step 440. In one embodiment, the value may indicate an anomaly should be triggered if it exceeds a threshold. This is discussed in more detail with respect to step 620 of the process of FIG. 6. If the value of the count indicates that an anomaly should be triggered, an anomaly event is generated at step 445. The anomaly event may result in an alert being generated, a message sent to a pager or email address, or some other action. The alert may include data associated with the anomaly, for example, the data type (response time or other data type or metric) the value of the data point which triggered the anomaly, the expected values, the functions that voted for the anomaly event, and other data. The process then continues to step 450. If the value of the count indicates that an anomaly should not be triggered, the process continues to step 450.

A determination is made as to whether more values in the current application performance data time series data set exist to be compared at step 450. If more values in the current data set exist to be compared, the process continues to step 455. If no further values in the current application performance data set exist to be compared, the process of FIG. 4 continues to step 470 where the process ends.

Statistical models used to predict data points are updated with the most recent data point at step 465. The functions may be updated to incorporate all received time series data points, including the data point involved in the comparison at step 425. This is performed to ensure that the function may predict the next time series value based on the most recent data points. Next, predicted data points are generated by each statistical model for the next point of the current data set at step 460. Generation of the predicted data point at step 460 is performed in the same manner as discussed above at step 420 and discussed below in more detail with respect to FIG. 5. The predicted value generated from each function is compared to the next point in the current data set and a corresponding count is updated at step 465. This is performed as discussed above at step 425 and in more detail below with respect to the process of FIG. 6. The process of FIG. 6 then returns to step 440.

Figure 5:
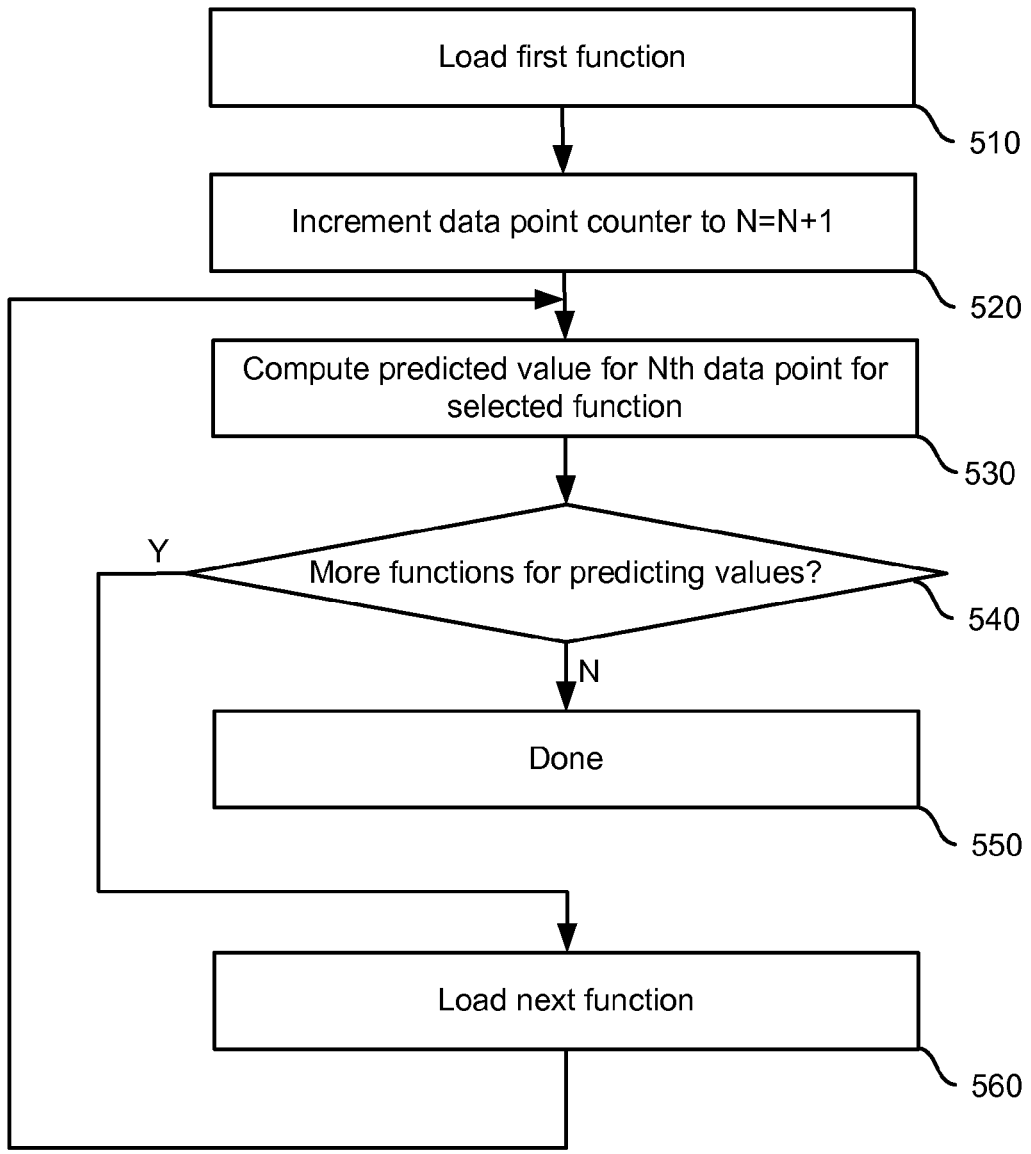
FIG. 5 illustrates a flowchart of an embodiment of a process for generating predicted values for a time series data point.

FIG. 5 illustrates a flowchart of an embodiment of a process for generating predicted values for a time series data point. In one embodiment, the process of FIG. 5 provides more detail for steps 420 and 460 of the process of FIGS. 4A-B. A first function of two or more functions is loaded at step 510. A data point counter is incremented as N=N+1 by one at step 520. The data point counter tracks the current predicted data point generated by the functions. A predicted value for the current data point is computed for the currently loaded function at step 530. Thus, the next data point in the data series is computed for the selected function. For example, for a moving average function based on the last three data points, if the last three data points in a time series are 0.233, 0.235 and 0.234, the predicted data point would be the average of these points, or 0.234.

A determination is made as to whether more functions exist for predicting values at step As discussed above, examples of functions which may be used to predict data point values include moving average, weighted moving average, single exponential smoothing, double exponential smoothing, triple double exponential smoothing, exponentially weighted moving average, Holt's linear exponential smoothing, Holt-Winters forecasting technique, and others. If more functions exist for predicting the next data point value, the next function is loaded at step 560 and the process of FIG. 5 continues to step 530. If no more functions exist for predicting the next data point value, the process of FIG. 5 continues ends at step 550.

Figure 6:
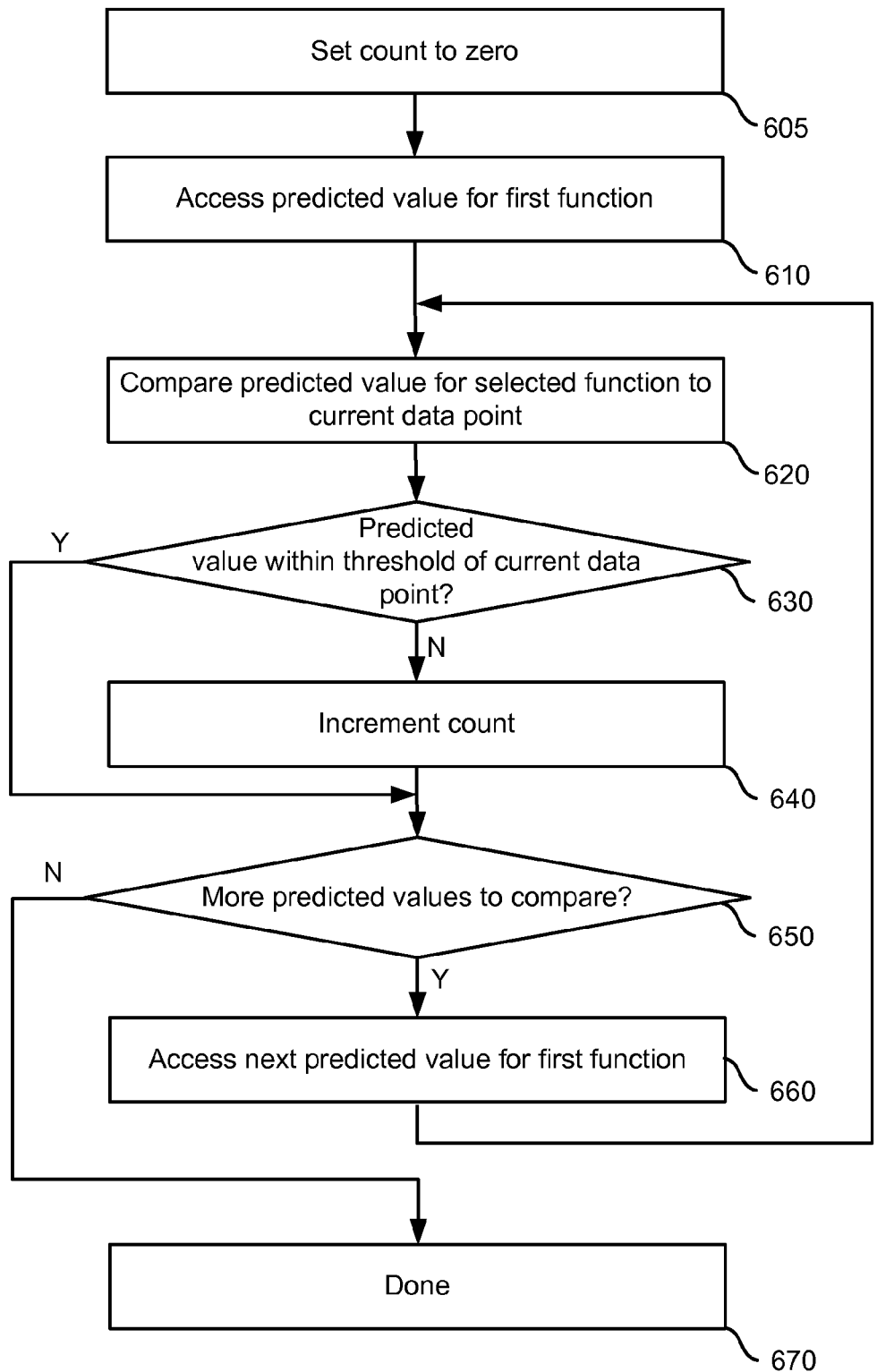
FIG. 6 illustrates a flowchart of an embodiment of a process for determining a count of predicted time series values that are not within a threshold of actual time series values.

FIG. 6 illustrates a flowchart of an embodiment of a process for determining a count of predicted time series values that are not within a threshold of actual time series values. In one embodiment, the process of FIG. 5 provides more detail for steps 425 and 465 of the process of FIGS. 4A-B. An anomaly vote count is set to zero at step 605. The first predicted value of the next time series data point as generated by the first function is accessed at step 610. The predicted value is the first value generated at step 530 in the process of FIG. 5. The accessed predicted value is then compared to the actual time series data point at step 620.

A determination is made as to whether the predicted value is within a threshold of the current data point (or vice versa) at step 630. The threshold may be a number, a majority or percentage of the functions used in comparing actual data points to predicted data points, or some other value. For example, the threshold may be five percent of the of the predicted data point value. Thus, if the predicted value is 200, the actual value must be in a range of 190 to 210 (five percent of the predicted value). If the predicted value is within the threshold, the process of FIG. 6 continues to step 650. If the predicted value is not within the threshold, the count is incremented at step 640. The increment to the count may act as a "vote" towards recognizing that the time series data point is an anomaly. The increment may be equal for each function or be weighted as discussed with respect to the process of FIG. 7.

A determination is then made as to whether more predicted values exist to be compared at step 650. Predicted values may exist if additional time series data points were generated by additional functions for the actual data point. If more predicted values exist to be compared, the next predicted value of the time series data point is accessed at step 660 and the process of FIG. 6 continues to step 620. If no further predicted values exist to be compared, the process of FIG. 6 ends.

Figure 7:
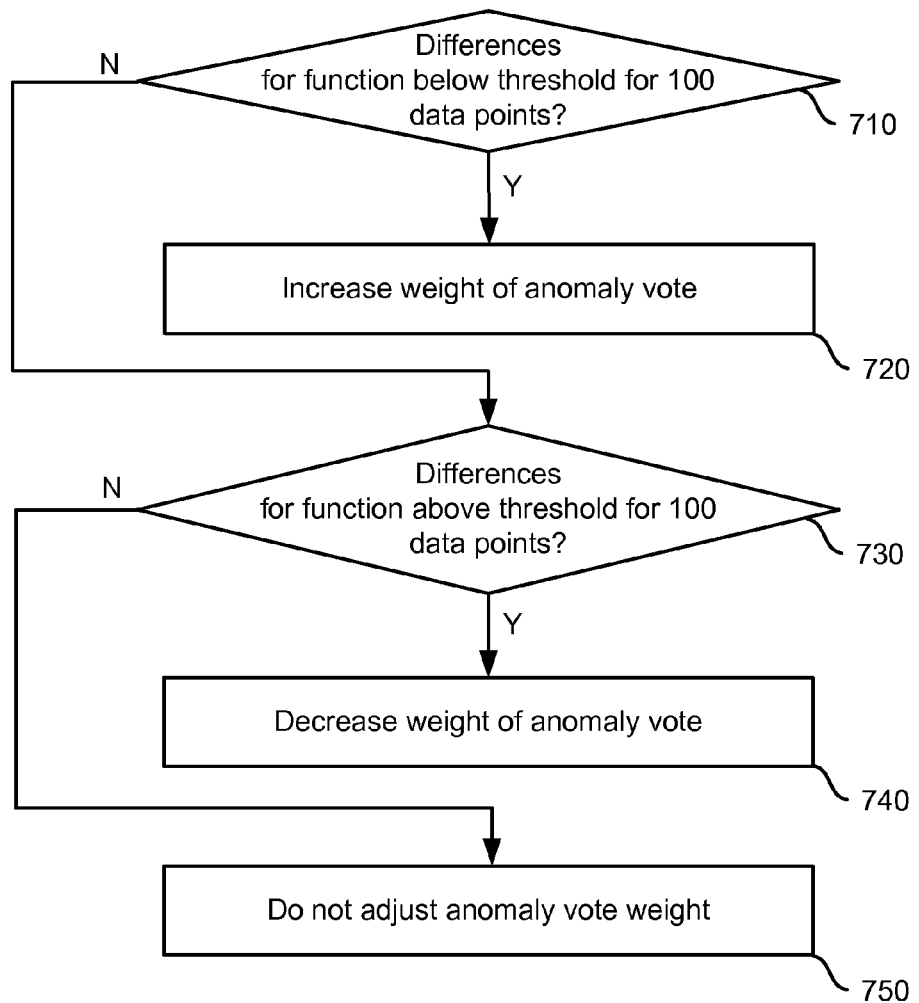
FIG. 7 illustrates a flowchart of an embodiment of a process for generating modifying the weight of an anomaly vote.

FIG. 7 illustrates a flowchart of an embodiment of a process for weighting an anomaly vote for a function. In some embodiments, a "vote" of a single function may increment a counter by a value greater or less than the normal value. The weight of the vote would be applied to the count at step 640 of the process of FIG. 6.

First, a determination is made as to whether the difference calculated between actual data points and the data points predicted by a function has been less than the threshold for incrementing the anomaly count for the last one hundred data points. Thus, a determination identifies whether the function has a history of accurately predicting values for the times series. In some embodiments, other numbers of data points can be used besides one hundred, such as fifty, seventy-five, two hundred, or some other number. In some embodiments, the number may be expressed as a percentage of the data points analyzed, a time period, or some other format. If the differences calculated have been less than the threshold for the particular number of data points, the weight of the anomaly vote for the function is increased at step 720. For example, a "vote" associated with the particular function may increment the count by two instead of one. This is done because the history of the function indicates the function closely predicts the actual value of the data points, and data points that differ significantly from the trusted function values are of more concern than the differences for other functions. However, the other functions are still considered and a vote from at least one other function can be received to generate an anomaly event. If the differences calculated have not been less than the threshold for the particular range of data points, the process of FIG. 7 continues to step 730.

A determination is made as to whether the difference calculated between actual data points and the data points predicted by a function have been more than the threshold for incrementing the anomaly count for the last one hundred data points. In contrast to the determination at step 710, this determination identifies whether the function has a history of consistently failing to predict the actual values within the threshold. Other numbers may be used in place of one hundred data points, as well as percentages and time periods. If the differences calculated have been more than the threshold for the particular number of data points, the weight of the anomaly vote for the function is decreased at step 740. If the differences calculated have not been more than the threshold for the particular range of data points, the process of FIG. 7 ends without any change being made to the weight of the vote for the particular function.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

I claim:

1. A method for detecting an anomaly, comprising:
   receiving a first set of data of a time series;
   accessing two or more functions fitted to the time series;
   determining whether the first set of data differs from a threshold associated with a predicted value for each function;
   calculating a first count as the number of thresholds exceeded by the first set of data and
   determining whether to generate an anomaly event based on the value of the first count.

2. The method of claim 1, wherein the first set of data is a time series of application performance data.

3. The method of claim 1, wherein the threshold is specific to each function, said step of determining whether the first set of data exceeds a threshold includes:
accessing a threshold associated with a predicted data point value for each of the two or more functions; and
comparing each threshold to a data point in the first set of data.

4. The method of claim 1, wherein the threshold is a percentage of the predicted value.

5. The method of claim 1, wherein the threshold changes as the predicted value of the time series changes.

6. The method of claim 1, wherein said step of determining includes:
determining whether the count is equal or greater than half the total number of two or more functions.

7. The method of claim 1, determining whether the count is at least two.

8. The method of claim 1, wherein said step of determining includes:
weighting a vote associated with at least one of the two or more functions; and
casting a vote for each function for which the first set of data differs by more than the threshold from the predicted value for the function.

9. One or more processor readable storage devices having processor readable code embodied on said processor readable storage devices, said processor readable code for programming one or more processors to perform a method comprising:
receiving a series of data points;
predicting an expected data point for the series of data points using each of two or more functions;
comparing a data point of the series of data points to the two or more expected data points; and
determining whether to generate an event based on the two or more comparisons.

10. The one or more processors of claim 9, wherein the series of data points is a series of application runtime data.

11. The one or more processors of claim 9, wherein said step of predicting an expected value includes:
fitting the two or more functions to a first set of data in the series of data points; and
generating an expected data point value using each of two or more functions for a second set of data in the series of data points.

12. The one or more processors of claim 9, wherein said step of comparing a data point includes:
incrementing a count for each instance that the actual data point exceeds a threshold range associated with each predicted data point.

13. The one or more processors of claim 12, wherein said step of incrementing includes:
weighting an increment value associated with a first function of the two or more functions based on past comparison of prior data points and prior expected data point values generated by the first function.

14. The one or more processors of claim 9, wherein said step of determining whether to generate an event includes:
accessing a count value; and
determining whether the count value is more than half the value of the number of two or more functions.

15. One or more processor readable storage devices having processor readable code embodied on said processor readable storage devices, said processor readable code for programming one or more processors to perform a method comprising:
receiving a series of data points;
predicting an expected data point for the series of data points using each of two or more functions;
comparing a data point of the series of data points to the two or more expected data points; and
determining whether to generate an event based on the two or more comparisons, wherein said step of comparing a data point includes:
incrementing a count for each instance that the actual data point exceeds each predicted data point.

16. An apparatus for processing data, comprising:
a communication interface;
a storage device; and
one or more processors in communication with said storage device and said communication interface, said one or more processors perform a method comprising
receive a first set of data,
fit two or more functions to the first set of data,
receive a second set of data,
compare a point in the second set of data to a predicted point generated from each fitted function,
determine whether a difference for each comparison exceeds a threshold, and
generate an anomaly event based on the number of comparisons that exceed a corresponding threshold.

17. The apparatus of claim 16, wherein the one or more processors receive the first set of data and second set of data from an application.

18. The apparatus of claim 16, wherein the one or more processors determine whether a difference for each comparison exceeds a threshold which is specific to each function.

19. The apparatus of claim 16, wherein each threshold is a percentage of the predicted value.

20. The apparatus of claim 16, wherein the threshold changes as the predicted value of the time series changes.

21. The apparatus of claim 16, wherein one or more processors:
increment a count each comparison between a point in the second data set and a predicted point for which the second data set point exceeds a second threshold associated with the predicted point.

22. The apparatus of claim 21, wherein one or more processors determine whether the count is equal or greater than half the total number of two or more functions.

23. The apparatus of claim 16, wherein one or more processors determine whether the count is at least two.

24. A method for detecting an anomaly, comprising:
receiving a first set of data;
fitting a first portion of the first set of data to two or more functions;
determining whether a selected point in the first set of data differs from a predicted point generated using each of the two or more functions by more than a threshold corresponding to each function;
generating a count which represents differences between the selected point and a threshold corresponding with each predicted point; and
determining whether to generate an event based on the count.

25. The method of claim 24, wherein the data is application performance data.

26. The method of claim 24, wherein said step of fitting includes:

accessing the first portion of the first set of data;

fitting each of the two or more functions to the first portion of data, wherein said step of determining whether a selected point in the first set differs from a predicted point is performed using data from the first set of data which is not included in the first portion of data.

27. The method of claim 24, further comprising:

generating a threshold corresponding to each of the two or more functions in response to said step of fitting a first portion.

28. The method of claim 24, wherein said step of determining whether to generate an event includes:

accessing a count value; and determining whether the count value is greater than a second threshold value.

29. The method of claim 24, further comprising:

generating an anomaly alert in response to the generated event.

30. A method for detecting an anomaly, comprising:

receiving a first set of data;

fitting a first portion of the first set of data to two or more functions;

determining whether a selected point in the first set of data differs from a predicted point generated using each of the two or more functions by more than a threshold corresponding to each function;

generating a count which represents differences between the selected point and a threshold corresponding with each predicted point; and determining whether to generate an event based on the count, wherein said step of generating a count includes:

incrementing the count for each time that the selected data point exceeds the threshold for a predicted data point.

31. The method of claim 30, wherein said step of generating a count includes:

weighting the increment associated with a first function of the two or more functions based on the accuracy of prior predicted data points for the first function with respect to the first set of data.

\* \* \* \* \*